UNITED STATES PATENT OFFICE 2,464,600

PROCESS FOR PREPARING DIPHENYL-DIHALOETHANES

Erich F. Meitzner, Philadelphia, and William F. Hester, Drexel Hill, Pa., assignors to Rohm & Haas Company, Philadelphia, Pa., a corporation of Delaware No Drawing. Application March 20, 1945, Serial No. 583,852

7 Claims. (Cl. 260—649)

This invention relates to an improved method for the preparation of 1,1-dihalo-2,2-diphenyl ethanes. With greater particularity, this invention deals with a method which comprises halogenating ethyl alcohol and reacting the resulting product by condensing it with an aromatic compound of the benzene series in the presence of an excess of an acidic condensing agent. The compounds thus obtained have the formula

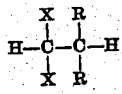

wherein X is chlorine or bromine and R is a phenyl nucleus.

Heretofore, such compounds have been prepared by condensing dihaloacetaldehyde or dihaloacetaldehyde diethyl acetal with benzene or substituted benzene. While this condensation can be effected with a fair yield, the preparation of the dihaloacetaldehyde or its diethyl acetal is fraught with difficulties which limit the yield of these intermediates and cause a poor yield for the overall process, starting from initial materials such as ethyl alcohol and chlorine. The product obtained by the chlorination of ethyl alcohol may be converted to dichloroacetaldehyde by distillation from concentrated sulfuric acid with evolution of hydrogen chloride, formation of a charry mass and sulfur dioxide, and a yield of only about 20% to 30% of theory. Decomposition of the chlorinated product without sulfuric acid has been reported to require temperatures of 230°–240° C.

It was, therefore, an unexpected discovery that the halogenation product of ethyl alcohol condenses with an aromatic compound of the benzene series in the presence of an excess of a strongly acidic condensing agent at temperatures between about 0° or 10° C. and about 75° C. The halogenation product from ethyl alcohol may be mixed with benzene or benzene derivative and acidic condensing agent added thereto. Alternatively, the acidic condensing agent may be mixed with a benzene compound and this mixture reacted with the halogenation product. If the halogenation product and acidic condensing agent are combined directly, however, the vigor of the ensuing reaction leads to decomposition products which cause a decrease in yield and contamination of the material thus obtained, as noted above.

The halogenating of ethyl alcohol may be carried out by passing chlorine gas or bromine vapor into the alcohol or by adding liquid bromine slowly, with stirring, to the alcohol. Temperatures of 10° C. to 50° C. may be used for this reaction. Pure absolute alcohol may be used but is not required, and the usual ethyl alcohols of commerce, even in a denatured form, are satisfactory. The presence of some water in the alcohol does not interfere with the reactions involved. As halogen is passed into the alcohol, hydrogen halide escapes. Soon the liquid forms two layers. The lower layer increases steadily in specific gravity and in size. For example, after the specific gravity has reached a value of over 1.2 in the chlorination of ethyl alcohol, the lower layer becomes suitable for condensation with an aromatic compound. The optimum yields are obtained, however, if halogenation is carried to the point at which the halogen is taken up but slowly. At this point, it generally happens that the chlorine content of the lower layer is 50% to 60% and the bromine content is 60% to 70%, depending on all of the conditions involved. The point at which halogenation is discontinued is not critical, however, since halogenated products from ethyl alcohol have been successfully used differing by as much as 0.16 unit in specific gravity. The products in the lower layer thus obtained appear to be chiefly trihalo-ethyl ethers.

In spite of the formation of two layers, both may be used in the subsequent condensation reaction. The layers may be used together or they may be used separately, the latter procedure usually giving somewhat better overall yields and constituting the preferred procedure.

The halogenated product from ethyl alcohol is condensed with an aromatic compound of the benzene series having nuclear positions available for substitution. This compound may be benzene itself, chlorobenzene, bromobenzene, an alkoxybenzene such as methoxybenzene, ethoxybenzene, propoxybenzene, or butoxybenzene, ethoxy ethoxybenzene, chloroethoxybenzene, toluene, xylenes, butylbenzenes, diphenyl, phenoxybenzene, benzophenone, acetophenone, nitrobenzene, chloronitrobenzene, etc.

As a condensing agent for the desired reaction between the halogenated product and the aromatic compound, there may be used any strongly acidic condensing agent, such as sulfuric acid, oleum, tetraphosphoric acid, toluene or benzene sulfonic acids, aluminum chloride, zinc chloride (particularly with some free hydrogen chloride), boron trifluoride and its coordination complexes, and the like. The amount of such condensing agent is at least equal molecularly to the aromatic compound actually reacted with the halogenated product from ethyl alcohol and is preferably in excess. While there appear to be some slight differences among the various strongly acidic condensing agents in regard to the relative proportions of the various isomers which may be obtained from different starting materials, any of the various strongly acidic agents with obvious adjustment in conditions will effect the indicated condensation reaction between the halogenated products from ethyl alcohol and a phenyl compound.

If desired, the aromatic compound may be used in excess and thus also serve as a solvent. While an organic solvent is not essential, it is often convenient to use one during the mixing of the reactants or during the working up of the reaction products. For such purposes, there may be used hydrocarbons, including naphthas, or other organic solvents such as ethylene chloride, and similar solvents.

Such solvents assist in the separation and purification of the condensation products. With these products in solution, they may be readily washed with water, neutralized, and separated from the condensing agent. The solvent may then be stripped off, unreacted starting materials removed as by distillation, and the condensation products obtained as a residue which may, if desired, be purified as by extracting, charcoaling, or recrystallizing. The products obtained have considerable value as toxicants in insecticidal compositions.

In the condensation of the halogenated products from ethyl alcohol with an aromatic compound of the benzene series, it is desirable to control the temperature of the reaction. Optimum yields are obtained when the initial stage of mixing reactants in the presence of an acidic condensing agent is held between 20° and 40° C. and the reaction is completed by heating to not over 75° C. With a condensing agent such as sulfuric acid or oleum, the temperature is desirably kept conveniently low to minimize sulfonation. With these readily observed precautions, sulfuric acid is a particularly desirable agent.

Further details of the process for preparing 1,1-dihalo-2,2-diphenyl ethanes are given in the following illustrative examples.

*Example 1*

Anhydrous ethyl alcohol was placed in a large reaction flask and chlorine gas from a cylinder was slowly bubbled therethrough. The rate of addition was such that the temperature of the reaction mixture never exceeded 35° C. As chlorine was absorbed, two layers formed. When the specific gravity of the lower layer had reached 1.29 at 20° C., the reaction was interrupted. A portion of 179 parts of this lower layer was taken and cooled to about 20°–25° C. and slowly added, with stirring, to a previously prepared mixture of 675 parts of chlorobenzene and 666 parts of technical 98% sulfuric acid.

During the addition of the lower layer to the chlorobenzene and acid, the temperature was held at 28°–32° C. Stirring was continued for three hours, during which period the reaction mixture was heated to 60° C. It was then allowed to stand quietly and separate into layers. The lower layer of acid was withdrawn. The upper layer was washed with water, with a dilute solution of sodium carbonate, and again with water. It was filtered and concentrated under reduced pressure. A light brown oil was thus obtained, amounting to 297 parts. It solidified on standing and had a setting point of 83° C. Recrystallization of the crude product from naphtha or from alcohol yielded a white crystalline material melting at 109–110° C. This composition corresponded in analysis to $CHCl_2CH(C_6H_4Cl)_2$. The mother liquors yielded products having the same composition but having a melting point of 66° C. and being isomeric with the material of higher melting point.

*Example 2*

Another portion of 90 parts of the chlorinated products from ethyl alcohol was added to 146 parts of chlorobenzene, and 333 parts of 98% sulfuric acid were gradually added to the mixture. The temperature of the first mixture was 8° C., and, during the course of the hour required for the addition of acid, the temperature reached 32° C. The reaction mixture was stirred and heated to over 60° C. during the course of four hours. During this time, some solid reaction product separated. To assist in separation of the entire reaction product, about 250 parts of ethylene chloride was added. Good layer separation was then obtained. The lower layer was withdrawn from the mixture. The ethylene chloride layer was washed with water, with dilute sodium carbonate solution, and again with water. It was then dried over calcium chloride, filtered, and concentrated by evaporation of the solvent. There remained 140 parts of the condensation product.

*Example 3*

Chlorine was passed into ethyl alcohol until the specific gravity of the lower layer formed during the reaction was 1.29–1.30. A portion of 220 parts of this was taken and added during the course of an hour and a quarter to a mixture of 802 parts of 98% sulfuric acid and 420 parts of bromobenzene which had been cooled to 10° C. During the addition, the temperature of the resulting mixture reached 42° but was then brought below 40° C. by external cooling. Some crystalline material began to separate shortly, but the reaction mixture was heated to 58° C. and then separated from the acid with the aid of ethylene chloride. The extracted portion yielded 461 parts of a light brown oil which was taken up in a little hot methanol. White crystals were readily obtained therefrom which, on recrystallization from petroleum ether, melted at 132°–133° C. and had the composition, $CHCl_2CH(C_6H_4Br)_2$.

*Example 4*

The procedure of Example 3 was followed with 90 parts of the chlorinated lower layer from ethyl alcohol, 130 parts of benzene, and 333 parts of 98% sulfuric acid. There was obtained 105 parts of a condensation product having the composition $CHCl_2CH(C_6H_5)_2$.

*Example 5*

(a) The procedure of Example 1 was followed with the exception that the chlorination of ethyl alcohol was carried only to the point at which the lower layer had a specific gravity of 1.23. The product obtained corresponded to 85.6% of theory.

(b) When the lower layer was carried to a specific gravity of 1.30, the yield of condensation products was 90.5%.

(c) When the lower layer was carried to a specific gravity of 1.33, the yield was 87.4%.

(d) When the chlorination was continued over a long period of time and the specific gravity became practically constant at 1.36, this chlorination product gave a yield of condensate of 82% of composition $HCCl_2 \cdot CH(C_6H_4Cl)_2$.

The most useful range of specific gravity of the lower layer from the chlorination of ethyl alcohol is 1.26 to 1.30.

Example 6

A portion of 178 parts of the chlorination product of ethyl alcohol (starting with denatured alcohol, No. 2B) having a specific gravity of about 1.30 was slowly added to a cooled mixture of 220 parts of methoxybenzene and 400 parts of sulfuric acid. The temperature gradually rose to 35°–40° C. and was then carried to 60°–65° C. The reaction product was then taken up in ethylene chloride, separated, and purified as in the previous examples. The final product had the composition $CHCl_2CH(C_6H_4OCH_3)_2$. It melted in a crude form at 100°–109° C. and at 115°–116° C. after recrystallization from naphtha.

Example 7

(a) The upper layer from the chlorination of ethyl alcohol (specific gravity about 1.2) was extracted with chlorobenzene and the extract was then treated with concentrated sulfuric acid. The reaction mixture was heated to about 60° C. and then extracted with additional chlorobenzene. From 90 parts of "upper layer," 1468 parts of chlorobenzene in all, and 535 parts of acid there was obtained 45 parts of residual oil, giving a product identical by analysis with that obtained from the lower layer as in Example 1.

(b) The above method was followed, using 91 parts of lower layer, 146 parts of chlorobenzene, and 385 parts of sulfuric acid which had been recovered from condensation of lower layer with chlorobenzene. The product when worked up as before gave 53.5 parts of a light brown oil consisting of dichlorodi(chlorophenyl) ethanes.

By chlorinating or brominating ethyl alcohol until two layers are formed and the lower layer has a specific gravity above 1.2 and comprises chiefly a trihaloethyl ethyl ether and by reacting the halogenated product thus obtained with an aromatic compound of the benzene series in the presence of a strongly acidic condensing agent in an amount in excess of the amount of aromatic compound reacting with the halogenated product (on a molecular basis) at a temperature below about 75° C., there are obtained products of the formula

$$CHX_2 CHR_2$$

wherein X is chlorine or bromine and R is a phenyl nucleus. The method is economical of materials and time and gives yields of the desired products of 80% to 95%.

We claim:

1. A process for preparing compounds of the formula

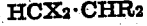

$$HCX_2 \cdot CHR_2$$

wherein X is a halogen selected from the class consisting of chlorine and bromine and R is an aromatic radical of the benzene series, which comprises reacting a said halogen and ethyl alcohol at 10° C. to 50° C., until the resulting halogenated products form two layers, and reacting by condensing said products with an aromatic compound of the benzene series having nuclear positions available for substitution within the temperature range of 10° C. to 75° C. in the presence of an excess of a strongly acidic condensing agent.

2. A process for preparing compounds of the formula

$$HCX_2 \cdot CHR_2$$

wherein X is a halogen selected from the class consisting of bromine and chlorine and R is an aromatic radical of the benzene series, which comprises reacting a said halogen and ethyl alcohol at 10° C. to 50° C. until the resulting halogenated products have formed an upper layer and a lower layer, separating the lower layer, and reacting by condensing it with an aromatic compound of the benzene series having nuclear positions available for substitution within the temperature range of 10° C. to 75° C. in the presence of an excess of a strongly acidic condensing agent.

3. A process for preparing compounds of the formula

$$HCX_2 \cdot CHR'_2$$

wherein X is a halogen selected from the class consisting of bromine and chlorine and R' is a halophenyl group, which comprises reacting a said halogen and ethyl alcohol at 10° C. to 50° C. until the resulting halogenated products have formed two layers and reacting by condensing said products with a halobenzene having nuclear positions available for substitution within the temperature range of 10° C. to 65° C. in the presence of an excess of concentrated sulfuric acid.

4. A process for preparing compounds of the formula

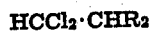

$$HCCl_2 \cdot CHR_2$$

wherein R is an aromatic radical of the benzene series, which comprises reacting chlorine and ethyl alcohol at 10° C. to 50° C. until the resulting chlorinated products have formed two layers and reacting by condensing said products with an aromatic compound of the benzene series having nuclear positions available for substitution within the temperature range of 10° C. to 75° C. in the presence of a strongly acidic condensing agent.

5. A process for preparing compounds of the formula

$$HCCl_2 \cdot CHR_2$$

wherein R is an aromatic radical of the benzene series, which comprises reacting chlorine and ethyl alcohol at 10° C. to 50° C. until the resulting chlorinated products have formed an upper layer and a lower layer, separating the lower layer, and reacting by condensing it with an aromatic compound of the benzene series having nuclear positions available for substituion within the temperature range of 10° C. to 75° C. in the presence of an excess of a strongly acidic condensing agent.

6. A process for preparing compounds of the formula

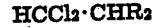

$$HCCl_2 \cdot CHR_2$$

wherein R is an aromatic radical of the benzene series, which comprises reacting chlorine and ethyl alcohol at 10° C. to 50° C. until the resulting chlorinated products form two layers, the lower of which has a specific gravity between 1.2 and 1.36 at 20° C., separating said lower layer, and reacting by condensing it with an aromatic compound of the benzene series having nuclear posipound of the benzene series having nuclear positions available for substitution within the temperature range of 10° C. and 75° C. in the presence of a strongly acidic condensing agent.

7. A process for preparing a compound of the formula $$HCCl_2 \cdot CH(C_6H_4Cl)_2$$

which comprises reacting chlorine and ethyl alcohol at 10° C. to 50° C. until the resulting chlorinated products form two layers, the lower of which has a specific gravity of 1.2 to 1.36 at 20° C., separating said lower layer, and reacting by condensing it with chlorobenzene within the temperature range of 10° C. to 75° C. in the presence of an excess of sulfuric acid as an acidic condensing agent.

ERICH F. MEITZNER.
WILLIAM F. HESTER.

REFERENCES CITED

The following references are of record in the file of this patent:

UNITED STATES PATENTS

| Number | Name | Date |
| --- | --- | --- |
| 774,151 | Besson | Nov. 8, 1904 |
| 2,329,074 | Muller | Sept. 7, 1943 |

OTHER REFERENCES

Wood et al.: "U. S. Dispensatory," 23rd ed., page 293.

Groggins: "Unit Processes in Organic Synthesis," first edition, pages 192–4 (1935).